United States Patent Office 2,731,485
Patented Jan. 17, 1956

2,731,485

POLYSILOXANES PRODUCED BY THE REACTION OF DIALKYLDIALKOXYSILANES IN THE PRESENCE OF ALUMINUM OR BORON HALIDES

George H. Wagner, Kenmore, and Charles E. Erickson, Buffalo, N. Y., assignors, by mesne assignments, to Union Carbide and Carbon Corporation, a corporation of New York No Drawing. Application July 26, 1949,
Serial No. 106,972

2 Claims. (Cl. 260—448.2)

The invention relates to the anhydrous condensation of substituted silanes to form polysiloxanes. The starting materials contemplated by the invention are of the type

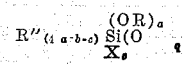

where R and R' are alkyl, X is halogen, usually chlorine, and one, but only one, of the numbers $a$, $b$ and $c$ may be zero. R" may be, for example, hydrogen or alkyl. Obviously the sum $a+b+c$ does not exceed 4, and is not less than 2. Examples of such compounds are $HSi(OEt)_2Cl$, $Et_2Si(OEt)_2$, $EtSi(OEt)_2Cl$, $EtSi(OEt)Cl_2$, $Et_2Si(OEt)Cl$.

On condensation, an alkyl halide is formed if halogen is present, and the Si—O—Si linkage is generated:

$$EtSi(OEt)Cl_2 \rightarrow [EtSiOCl]_x + EtCl$$

If halogen is absent, a simple or mixed ether is formed:

$$Et_2Si(OEt)_2 \rightarrow [Et_2SiO]_x + Et_2O$$

In some cases both an alkyl halide and an ether are produced:

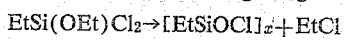

A plurality of compounds of the type disclosed above may be conjointly condensed. Whether a single compound of this type is taken, or more than one, the reaction mixture may also contain such compounds as $Et_2SiCl_2$ and $Me_3SiCl$ which serve to modify the product in the way discussed in connection with Example 8 below.

EXAMPLE 1

$Et_2Si(OEt)_2$ (110 g.) was placed in a stainless steel pressure vessel with 2 g. of $AlCl_3$. On heating to 250° C. no reaction took place. Reaction occurred at 300° C., and in 24 hours 65 g. of liquid polymers were produced together with ethyl ether. The liquid polymers included the dimer 1,3-diethoxytetraethyldisiloxane, the cyclic trimer hexaethylcyclotrisiloxane, the straight chain trimer 1,5-diethoxyhexaethyltrisiloxane, and other liquid polymers with an average molecular weight greater than 500. (All molecular weights reported herein were determined by freezing-point depression in cyclohexane.)

EXAMPLE 2

$EtSi(OEt)_2Cl$ (41 g.) was refluxed for 20 hours with 2 g. of $AlCl_3$ producing 21 g. of white solid polymer and 11 g. of a mixture of ethyl chloride and ethyl ether. The polymer contained 30.9% C, 6.9% H and 29.5% Si. The theoretical values for $[EtSiO_{1.5}]_x$ are 29.6% C, 6.1% H and 34.6% Si.

EXAMPLE 3

$EtSi(OET)Cl_2$ [1] (49 g.) was refluxed for 18 hours with 1 g. of $AlCl_3$ producing 32 g. of liquid polymer containing hydrolyzable chlorine ($\equiv$Si—Cl), and 12 g. of ethyl chloride. This amount of ethyl chloride is quantitative for the reaction:

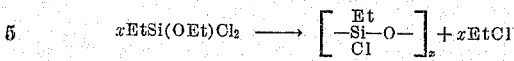

The chlorine content of the polymer was 34.1% as against a theoretical value of 32.7% for a product of the formula $[EtSiOCl]_x$.

EXAMPLE 4

$EtSiCl_3$ (123 g.) was refluxed with 42 g. of ethanol, ethyl chloride being evolved. The residual product (128 g.) was a mixture of $EtSi(OEt)Cl_2$, $EtSi(OEt)_2Cl$ and $EtSi(OEt)_3$. This mixture was refluxed for 20 hours with 2 g. of $AlCl_3$ producing 72 g. of solid polymer and 40 g. of a mixture of ethyl chloride and ethyl ether.

EXAMPLE 5

$Et_2Si(OEt)Cl$ (93 g.) was placed in a stainless steel reactor with 2 g. of $AlCl_3$. Upon heating for 24 hours at 250° C., 56 g. of liquid polymer and 20 g. of ethyl chloride were formed. The liquid polymer contained the cyclic trimer hexaethylcyclotrisiloxane, the cyclic tetramer octaethylcyclotetrasiloxane, and other liquid polymers with an average molecular weight greater than 500, a typical reaction being:

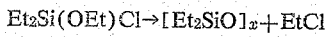

EXAMPLE 6

A mixture of 48 g. of $Et_2SiCl_2$ and 54 g. of $Et_2Si(OEt)_2$ was placed in a stainless steel reactor with 2 g. of $AlCl_3$. After 18 hours at 250° C. 54 g. of liquid polymer and 23 g. of ethyl chloride had been formed. About 32% of the polymer was the cyclic tetramer, formed by the reaction:

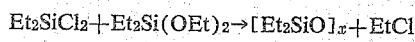

EXAMPLE 7

To 100 cc. of $HSi(OEt)_2Cl$ was added 0.1 g. of $AlCl_3$, and the mixture was heated to reflux (about 110° C.) for 2 hours. Ethyl chloride and ethyl ether were evolved during the refluxing, and a white solid was formed which was found by analyses for H, Si and C to have essentially the empirical formula $[HSiO_{1.5}]_x$. It was evidently formed by the reaction:

EXAMPLE 8

$Et_2SiCl_2$ (0.30 mol), $Et_2Si(OEt)_2$ (0.30 mol), and 2 g. of $AlCl_3$ were heated at 250° C. for four hours in a stainless steel reactor. The maximum pressure developed was 590 p. s. i. gauge, and 73 g. of product was obtained. A fractional distillation of this material is shown in annexed Table VII.

Several other reactions of this type were conducted under conditions which are summarized in Table I. The results of fractional distillation of these reaction products are shown in Tables II to IX. No attempt was made to collect the ethyl chloride or ethyl ether during these fractionations. When the composition of the products is discussed hereinafter, only the polymeric products are referred to.

It will be noted that boron trichloride was used in run 27 where reaction was obtained at 205° C. No reaction was obtained under the same conditions at 150° C. The purpose of the remaining experiments listed in Table I was to show the effect of the proportions of the two reactants, $Et_2SiCl_2$ and $Et_2Si(OEt)_2$, and also the effect of the presence of the monofunctional compound $Me_3SiCl$ on the products obtained. This will be discussed below.

---
[1] B. P. = 127° C.

When equal molecular quantities of Et$_2$Si(OEt)$_2$ and Et$_2$SiCl$_2$ react, the main reaction may be represented by:

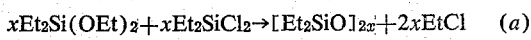

$$x\text{Et}_2\text{Si}(\text{OEt})_2 + x\text{Et}_2\text{SiCl}_2 \rightarrow [\text{Et}_2\text{SiO}]_{2x} + 2x\text{EtCl} \quad (a)$$

The liquid product should be principally cyclic compounds of the general formula (Et$_2$SiO)$_{2x}$ if the reaction is complete. Incomplete reaction would give compounds of the general formula Et[Et$_2$SiO]$_{2x}$Cl. These two points appear to be borne out by run 25 and run 27 (Table I) each of which employed equimolar proportions of reactants. It will be noted that the products of run 25 (Table VII) contained a large amount of cyclic tetramer and that, in general, the products are low in chlorine, i. e., low in Et[Et$_2$SiO]$_{2x}$Cl. Run 27 gave products containing considerable chlorine (Table IX) which is ascribed to incomplete reaction resulting from the use of a lower reaction temperature.

If an excess of the chloro compound is used in these reactions, linear polymers rather than cyclic polymers should be formed by the following reaction:

$$x\text{Et}_2\text{Si}(\text{OEt})_2 + (x+1)\text{Et}_2\text{SiCl}_2 \rightarrow$$
$$\text{Cl}[\text{Et}_2\text{SiO}]_{2x}\text{SiEt}_2\text{Cl} + 2x\text{EtCl} \quad (b)$$

Runs 22, 23, and 24 of Table I illustrate this point. The high chlorine content of the products is to be noted in these cases (Tables IV, V, and VI) as is the isolation of 1,3-dichlorotetraethyldisiloxane and 1,5-dichlorohexaethyltrisiloxane. The chlorine content of the products from run 24 is low because only a slight excess of Et$_2$SiCl$_2$ was used in this case. Some of the cyclic tetramer was formed and was isolated in the fractionation.

With an excess of Et$_2$Si(OEt)$_2$, the following reaction should prevail:

$$(x+1)\text{Et}_2\text{Si}(\text{OEt})_2 + x\text{Et}_2\text{SiCl}_2 \rightarrow$$
$$\text{EtO}[\text{Et}_2\text{SiO}]_{2x}\text{SiEt}_2(\text{OEt}) + 2x\text{EtCl} \quad (b)$$

Run 26 (Tables I and VIII) is an example of this type. The analyses are not sufficient to show the validity of Equation $c$ except that the products are low in chlorine. It will be noted that some cyclic tetramer formed.

Run 17 (Tables I and III) employed a small amount of the monofunctional Me$_3$SiCl along with the Et$_2$Si(OEt)$_2$ and Et$_2$SiCl$_2$. The effect of the monofunctional material, as is clearly shown by comparing the products of this run (Table III) with the products of the other runs, is to increase the molecular weight of the products. In this run 66% of the polymeric products had molecular weights of from 716 to 896. This is a larger amount of higher molecular weight material than was obtained in any of the other experiments, and is believed to be due to the formation of products of the general formula, Me$_3$Si(Et$_2$SiO)$_x$Cl, Me$_3$Si(Et$_2$SiO)$_x$OEt, and $$\text{Me}_3\text{Si}(\text{Et}_2\text{SiO})_x\text{SiMe}_3$$

in preference to cyclic structures.

Run 16 demonstrates the formation of low molecular weight products from a large amount of Me$_3$SiCl and a small amount of Et$_2$Si(OEt)$_2$. The incidence of a considerable amount of materials boiling above hexamethyl-3,3-diethyltrisiloxane, and especially the formation of hexamethyldisiloxane in this reaction are indicative of the following type of exchange:

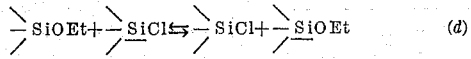

This type of exchange is necessary to explain the formation of 1,3-dichlorotetraethyldisiloxane in run 27 (Table I and Table IX). Equation $d$ may be considered a complication of the general reaction presented here so far as predicting the nature of the products is concerned.

*Table I*

| Run No. | Reactants | | Catalyst | Reaction Time in Hours | Temp., °C. | Pressure (p. s. i., max.) | Product Weight (Grams) |
|---|---|---|---|---|---|---|---|
| | Diethyl-dichloro-silane (Mols) | Diethyl-diethoxy-silane (Mols) | | | | | |
| 16 | | [1] 0.30 | 2 g. AlCl$_3$ | 20 | 250 | 800 | 99.5 |
| 17 | 0.44 | [1] 0.44 | 2 g. AlCl$_3$ | 20 | 250 | 750 | 120 |
| 22 | 0.60 | 0.30 | 2 g. AlCl$_3$ | 4 | 250 | 550 | 130 |
| 23 | 0.45 | 0.30 | 2 g. AlCl$_3$ | 4 | 250 | 640 | 115 |
| 24 | 0.33 | 0.30 | 2 g. AlCl$_3$ | 4 | 250 | 540 | 79 |
| 25 | 0.30 | 0.30 | 2 g. AlCl$_3$ | 4 | 250 | 590 | 73 |
| 26 | 0.24 | 0.30 | 2 g. AlCl$_3$ | 4 | 250 | 540 | 65 |
| 27A | 0.30 | 0.30 | 2 cc. BCl$_3$ | 16 | 150 | 0 | [2] |
| 27 | 0.30 | 0.30 | 2 cc. BCl$_3$ | 10 | 205 | 275 | 97 |

[1] In run 16, 0.6 mol of Me$_3$SiCl was included with the reactants, while in run 17, 0.046 mo of Me$_3$SiCl was used.
[2] No reaction.

*Table II*

FRACTIONATION OF PRODUCTS FROM RUN 16

[Charge=83.5 g.]

| Fraction | Boiling Point, °C. | Pressure, mm. | Grams | Hydrolyzable Chlorine, percent | Assumed Product |
|---|---|---|---|---|---|
| 1 | 0-97 | atm. | 14 | | |
| 2 | 97-100 | atm. | 13 | | hexamethyl-disiloxane. |
| 3 | 0-92 | 90 | 1 | | |
| 4 | 92-115 | 90 | 4 | | |
| 5 | 115-111 | 90-64 | 3 | | |
| 6 | 111-112 | 64 | 7 | | hexamethyl-3,3-diethyl-trisiloxane. |
| 7 | 112-115 | 64-18 | 2 | 2.26 | |
| 8 | 115-133 | 18 | 4 | 4.52 | |
| 9 | 133-139 | 18-9 | 9 | 1.18 | |
| 10 | 139-140 | 3 | 8 | 1.94 | |
| Res | | | 11.5 | | |

*Table III*

FRACTIONATION OF PRODUCTS FROM RUN 17

[Charge=80 g.]

| Fraction | Boiling Point, °C. | Pressure, mm. | Grams | Hydrolyzable Chlorine, percent | Mol. Wt. | Assumed Product |
|---|---|---|---|---|---|---|
| 1 | 0-82 | 3 | 3 | | | |
| 2 | 82-113 | 3 | 2 | | | |
| 3 | 113-122 | 3 | 4 | 13.45 | | |
| 4 | 122-127 | 3 | 3 | 8.42 | | cyclic tetramer. |
| 5 | 127-129 | 3 | 9.5 | 1.44 | | |
| 6 | 129-148 | 3 | 2 | 2.01 | | |
| 7 | 148-155 | 3 | 1 | | | |
| 8 | 155-168 | 3 | 13 | 7.06 | 716 | |
| Res | | | 35.5 | 6.07 | 895 | |

Table IV
FRACTIONATION OF PRODUCTS FROM RUN 22
[Charge=130 g.]

| Fraction | Boiling Point, °C. | Pressure, mm. | Grams | Hydrolyzable Chlorine, percent | Mol. Wt. | Assumed Product |
|---|---|---|---|---|---|---|
| 1 | 45-50 | 45 | 9 | 42.31 | | diethyldichlorosilane.[1] |
| 2 | 50-90 | 9 | 1 | | | |
| 3 | 90-91 | 9 | 25.5 | 27.10 | | 1,3-dichlorotetraethyldisiloxane.[2] |
| 4 | 91-92 | 9 | 3 | | | |
| 5 | 92-137 | 9 | 1 | | | |
| 6 | 137-136 | 9 | 22.5 | 19.57 | | 1,5-dichlorohexaethyltrisiloxane.[3] |
| 7 | 136-144 | 9 | 7 | 17.04 | | |
| 8 | 144-160 | 9 | 5 | 14.95 | | |
| Res | | | 46 | 14.33 | 577 | |

[1] Theoretical chlorine=45.1%.
[2] Theoretical chlorine=27.4%.
[3] Theoretical chlorine=19.65%.

Table V
FRACTIONATION OF PRODUCTS FROM RUN 23
[Charge=115 g.]

| Fraction | Boiling Point, °C. | Pressure, mm. | Grams | Hydrolyzable Chlorine, percent | Mol. Wt. | Assumed Product |
|---|---|---|---|---|---|---|
| 1 | 36-40 | 8 | 3 | | | |
| 2 | 40-89 | 8 | 1.5 | | | |
| 3 | 89-92 | 8 | 11.5 | 26.87 | | 1,3-dichlorotetraethyldisiloxane.[1] |
| 4 | 92-135 | 8 | 1.5 | | | |
| 5 | 135-145 | 8 | 19 | 17.20 | | 1,5-dichlorohexaethyltrisiloxane.[2] |
| 6 | 145-165 | 8 | 6 | | | |
| Res | | | 50 | 11.42 | 591 | |

[1] Theoretical chlorine=27.4%.
[2] Theoretical chlorine=19.65%.

Table VI
FRACTIONATION OF PRODUCTS FROM RUN 24
[Charge=79 g.]

| Fraction | Boiling Point, °C. | Pressure, mm. | Grams | Hydrolyzable Chlorine, percent | Mol. Wt. | Assumed Product |
|---|---|---|---|---|---|---|
| 1 | 0-142 | 9 | 1.5 | | | |
| 2 | 142-151 | 9 | 3.5 | 10.93 | | |
| 3 | 151-155 | 9 | 18 | 1.76 | | cyclic tetramer. |
| 4 | 155-178 | 9 | 2 | 6.88 | | |
| Res | | | 34 | 5.77 | 665 | |

Table VII
FRACTIONATION OF PRODUCTS FROM RUN 25
[Charge=73 g.]

| Fraction | Boiling Point, °C. | Pressure, mm. | Grams | Hydrolyzable Chlorine, percent | Mol. Wt. | Assumed Product |
|---|---|---|---|---|---|---|
| 1 | 0-127 | 8 | 1.5 | 8.92 | | |
| 2 | 127-148 | 8 | 2 | 6.47 | | |
| 3 | 148-153 | 8 | 16.5 | 0.92 | | cyclic tetramer. |
| 4 | 153-165 | 8 | .5 | 3.57 | | |
| Res | | | 33 | 4.85 | 678 | |

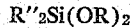

Table VIII
FRACTIONATION OF PRODUCTS FROM RUN 26
[Charge=65 g.]

| Fraction | Boiling Point, °C. | Pressure, mm. | Grams | Hydrolyzable Chlorine, percent | Mol. Wt. | Assumed Product |
|---|---|---|---|---|---|---|
| 1 | 0-109 | 9 | 1.5 | | | |
| 2 | 109-123 | 8 | 2 | 0.6 | | |
| 3 | 123-149 | 8 | 2.5 | 4.31 | | |
| 4 | 149-147 | 8-3 | 12.5 | 0.53 | | cyclic tetramer. |
| 5 | 147-158 | 3 | 3 | 1.23 | | |
| Res | | | 27 | 3.39 | 735 | |

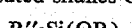

Table IX
FRACTIONATION OF PRODUCTS FROM RUN 27
[Charge=97 g.]

| Fraction | Boiling Point, °C. | Pressure, mm. | Grams | Hydrolyzable Chlorine, percent | Mol. Wt. | Assumed Product |
|---|---|---|---|---|---|---|
| 1 | 44-82 | 40 | 7 | | | |
| 2 | 82-89 | 10 | 1 | | | |
| 3 | 89-98 | 9 | 8 | 23.66 | | impure 1,3-dichlorotetraethyldisiloxane.[1] |
| 4 | 98-112 | 9 | 2 | 14.94 | | |
| 5 | 112-132 | 9 | 2 | 13.28 | | |
| 6 | 132-142 | 9 | 16 | 16.09 | | impure 1,5-dichlorohexaethyltrisiloxane.[2] |
| 7 | 142-154 | 9 | 8 | 5.88 | | |
| 8 | 154-160 | 9 | 8 | 11.93 | | impure cyclic tetramer. |
| Res | | | 24.5 | 9.48 | 672 | |

[1] Theoretical chlorine=27.4%.
[2] Theoretical chlorine=19.65%.

EXAMPLE 9

EtOSiCl₃ (280 g.) was refluxed for 4 hours with 3 g. of AlCl₃. When evolution of EtCl had ceased, there remained in the reaction vessel 180 g. of polymer. The reaction is represented by the following equation:

$$x\text{EtOSiCl}_3 \rightarrow x\text{EtCl} + [\text{Cl}_2\text{SiO}]_x$$

The AlCl₃ was boiled out of the siloxane at 250° C. leaving a blackish viscous material which reacted with phenol to form a diphenoxypolysiloxane. The quantity of phenol reacting confirmed the formula [Cl₂SiO]ₓ for the viscous product.

What is claimed is:

1. A process for preparing polysiloxanes which consists of heating substituted silanes of the type:

$$R''_2\text{Si}(OR)_2$$

where R and R" are alkyl radicals, in the presence of a catalyst taken from the group consisting of the halides of aluminum and boron to a temperature of above about 300° C. to evolve an alkyl ether and recovering a siloxane polymer from the reaction product.

2. A process for preparing polysiloxanes which consists of heating substituted silanes of the type:

$$R''_2\text{Si}(OR)_2$$

where R and R" are ethyl radicals, in the presence of a catalyst taken from the group consisting of the halides of aluminum and boron to a temperature of above about 300° C. to evolve an ethyl ether and recovering a siloxane polymer from the reaction product.

References Cited in the file of this patent

UNITED STATES PATENTS

| | | |
|---|---|---|
| 2,485,928 | Servais | Oct. 25, 1949 |
| 2,618,646 | Hatcher et al. | Nov. 18, 1952 |

FOREIGN PATENTS

| | | |
|---|---|---|
| 476,174 | Belgium | Oct. 31, 1947 |
| 478,117 | Belgium | Jan. 31, 1948 |

OTHER REFERENCES

Calingaert: "Jour. Am. Chem. Soc.," vol. 62 (1940), pages 1107-1110.

Volnov: "Jour. Gen. Chem.," U. S. S. R., vol. 17 (1947), pages 1428-35.

Dolgov: "Jour. Gen. Chem.," U. S. S. R., vol. 18 (1948), pages 1293-1296.